United States Patent [19]

Reinhardt et al.

[11] 4,105,743
[45] Aug. 8, 1978

[54] SELECTIVELY EXTRACTING COPPER, ZINC, NICKEL FROM A MIXTURE OF METAL HYDROXIDES

[75] Inventors: Hans Reinhardt, Västra Frölunda; Harald Daniel Ottertun, Mölndal; Sven Otto Sigbert Andersson, Källered, all of Sweden

[73] Assignee: Mx-Processer Reinhardt & Co. AB, Molndal, Sweden

[21] Appl. No.: 806,939

[22] Filed: Jun. 15, 1977

[30] Foreign Application Priority Data

Jun. 15, 1976 [SE] Sweden ............................. 7606818

[51] Int. Cl.² .................. C01G 3/14; C01G 9/00; C01G 53/12
[52] U.S. Cl. ........................................ 423/24; 423/32; 423/105; 423/109; 423/139; 423/150; 423/56; 423/144
[58] Field of Search .................. 423/27, 32, 33, 41, 423/109, 24, 139, 140, 150, 56, 105, 144; 75/103, 115

[56] References Cited

U.S. PATENT DOCUMENTS

| | | | |
|---|---|---|---|
| 2,837,406 | 6/1958 | Schantelberger | 423/105 |
| 3,929,598 | 12/1975 | Stern et al. | 423/32 |
| 3,953,306 | 4/1976 | Lancy | 423/140 |
| 3,966,569 | 6/1976 | Reinhardt et al. | 423/24 |
| 3,981,966 | 9/1976 | Baucom | 423/104 |

*Primary Examiner*—Brian Hearn
*Attorney, Agent, or Firm*—Burns, Doane, Swecker & Mathis

[57] ABSTRACT

A mixture of metal hydroxides is leached with an ammoniacal carbonate solution, to dissolve nickel, copper and zinc. Metal is recovered from the leaching solution. The solid leaching residue is leached with sulphuric acid at a pH of 1.5 – 3, to dissolve a further amount of nickel, copper and zinc. The acidic leaching solution is passed to the ammoniacal leaching process.

2 Claims, 1 Drawing Figure

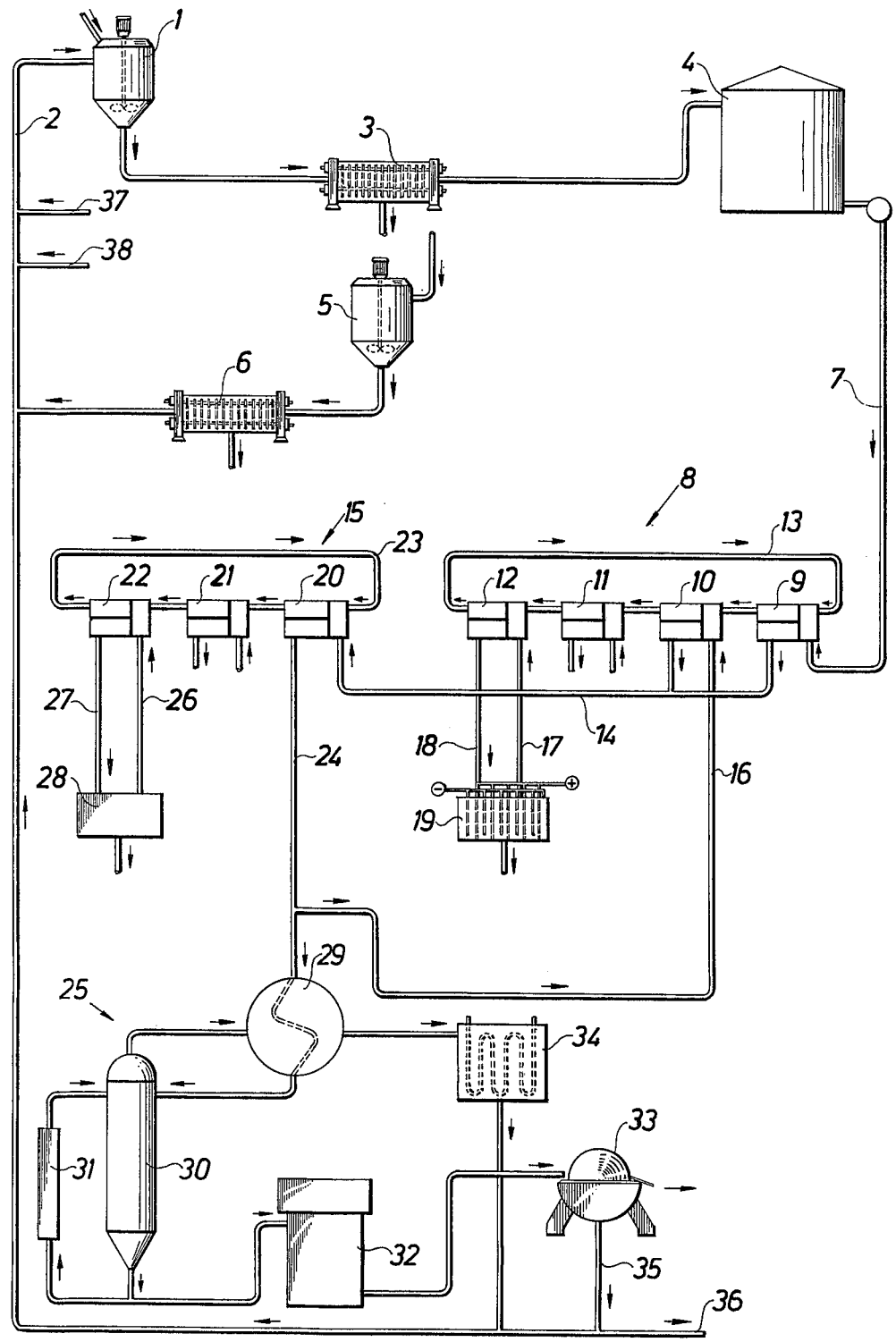

SELECTIVELY EXTRACTING COPPER, ZINC, NICKEL FROM A MIXTURE OF METAL HYDROXIDES

The invention relates to a process for extracting or recovering metals from a mixture of metal hydroxides, and more particularly a mixture of metal hydroxides containing at least one of the metals nickel, copper and zinc, and at least one of the metals iron and chromium.

Waste solutions containing different metal salts are obtained in pickling and galvanic processes. In general, these solutions are treated by the metals being precipitated in hydroxide form, e.g. by means of lime, whereafter the hydroxides are filtered off. The most usual metals present in such hydroxides are iron, chromium, nickel, copper and zinc. Metals can be extracted from hydroxides of this kind, and extracting the metals mentioned, with the exception of iron, can take place in a profitable manner. Iron is, however, an unprofitable ballast. The invention relates particularly to an extraction method where iron is separated from more expensive metals.

The process according to the invention is characterized in that the metal hydroxide mixture is leached with an ammoniacal carbonate solution, to dissolve nickel, copper and zinc; that metal is recovered from the leaching solution obtained; that the ammoniacal leaching solution thus obtained is refluxed to the ammoniacal leaching process, that the solid leaching residue obtained is leached with sulphuric acid at a pH of 1.5-3, whereby a further amount of nickel, copper and zinc are dissolved, and that the acid leaching solution thus obtained is passed to the ammoniacal leaching process.

The process is based on the fact that metals forming strong metal amine complexes go into solution during the ammoniacal leaching process. Nickel, copper and zinc are included in these metals. Metals which form weak metal amine complexes, such as iron and chromium, remain in the leaching residue as hydroxides.

It is known from various patent specifications that metals and metal hydroxides can be leached with an ammoniacal solution, or with an ammoniacal carbonate solution. Examples of such prior art are the U.S. Pat. Nos. 2.912.305, 3.832.162 and 3.981.966. The yield of the recovered metals has not been entirely satisfactory in the processes of the prior art. By double leaching the invention makes it possible to recover nickel, copper and zinc at a very high yield.

The table below shows leaching of Cu, Ni, Zn, Fe and Cr from galvanic hydroxide sludge, obtained on neutralizing a metal sulphate solution with NaOH, for different contents of total ammonia $[NH_3] + [NH_4]$ and total carbonate $[HCO^-_3] + [CO^{2-}_3]$. Leaching has been carried out at room temperature for 16 hours.

| No. | $[NH_3] + [NH_4^+] $ M | $[HCO_3^-] + [CO_3^{2-}]$ M | pH | [Cu] g/l | [Ni] g/l | [Zn] g/l | [Fe] g/l | [Cr] g/l |
|---|---|---|---|---|---|---|---|---|
| 1 | 2.68 | 1.12 | 9.85 | 1.84 | 1.72 | 1.90 | <0.01 | 0.06 |
| 2 | 3.31 | 1.12 | 10.1 | 1.84 | 1.77 | 1.95 | " | 0.05 |
| 3 | 4.13 | 1.10 | 10.4 | 1.92 | 1.77 | 2.06 | " | 0.07 |
| 4 | 4.78 | 2.90 | 8.98 | 1.94 | 1.82 | 2.03 | 0.01 | 0.27 |
| 5 | 5.48 | 2.93 | 9.39 | 1.92 | 1.77 | 2.00 | " | 0.23 |
| 6 | 6.25 | 2.95 | 9.78 | 1.92 | 1.87 | 2.18 | " | 0.24 |

The calculated maximum metal content in the leaching solutions was about 2 g/l for each metal. The Table shows that the metals Cu, Ni and Zn are leached out to 90-100% and this percentage increases somewhat with increasing total ammonia content. As could be expected, Fe and Cr do not leach out well. An increase can, however, be noted with increasing carbonate content.

The variables most heavily affecting leaching capacity are the total contents of ammonia and carbonate in the leaching solution. The total content of these substances is regulated by the addition of gaseous $NH_3$ and $CO_2$, respectively. An increase of the free content of $NH_3$ increases the total leaching capacity of the system with respect to Cu, Ni and Zn by an increased tendency towards the formation of the metal amine complex.

On the other hand, an increase in $CO_2$ content acts in the opposite direction through an increased tendency to form slightly soluble carbonates. The addition of ammonia should be large enough for the sum of the contents of free ammonia and ammonium ions to achieve 3-7 moles/l. The addition of carbon dioxide should be sufficiently great for the sum of the carbonate ions and hydrogen carbonate ions to achieve 1-3 moles/l.

Leaching is suitably carried out at normal temperature, i.e. 20°-25° C for a period of at most 10 hours. An increase of the temperature and time in excess of these values only gives a minor increase of the leaching yield. After completed leaching, the leaching residue is separated from the ammoniacal solution, suitably by filtering.

Ammoniacal leaching only dissolves a part of the nickel, copper and zinc content in the hydroxide mixture. We have found that the degree of leaching-out is especially low for hydroxide mixture that has been produced on the neutralization of acidic pickling baths and the like with calcium hydroxide, especially if the precipitation formed during neutralization has been exposed to air for some time. It is therefore often necessary to after-treat the leaching residue to achieve high yields. This after-treatment of the leaching residue takes place according to the the invention by leaching with sulphuric acid at a pH of 1.5-3. If the pH is kept at this value, leaching out of iron and chromium is negligible. Leaching is suitably carried on for 8-24 hours. The temperature should be increased preferably to 50°-80° C. The Table below shows leaching-out of the metals Cu, Ni, Zn, Fe and Cr from galvanic hydroxide sludge obtained during neutralization of a metal sulphate bath with $Ca(OH)_2$.

| Leaching number | Treatment | [Cu] g/l | [Ni] g/l | [Zn] g/l | [Fe] g/l | [Cr] g/l |
|---|---|---|---|---|---|---|
| 1. | Aqua regia (total leaching-out) | 1.00 | 1.35 | 1.82 | 0.74 | 1.80 |
| 2, | $NH_3$:6.5 M, $CO_2$:2.5 M, 30° C, 10 hours | 0,81 | 0.90 | 1.35 | 0.01 | 0.02 |
| 3. | a. $NH_3$:6.5 M $CO_2$:2.5 M 30° C, 10 hours b. $H_2SO_4$, pH=3 60° C, 6 hours | 0.98 | 1.31 | 1.79 | 0.01 | 0.04 |

The Table shows that for an ammoniacal system by itself, the leaching-out is not complete (Cu about 80% and Ni, Zn about 70%). With the double leaching of the invention, the leaching out of the metals Cu, Ni and Zn will be greater than 95%, while the major portion of the metals Fe and Cr remain in the leaching residue.

Iron and chromium have been effectively separated from nickel, copper and zinc, and can be taken out from the process as hydroxides. The separation of the iron and chromium has not consumed any chemicals. After calcination, the leaching residue can be used as a raw material in steel works, or it can be deposited.

The acidic leaching solution is supplied in the ammoniacal leaching process. Nickel, copper and zinc thereby form amine compounds. The minor amount of iron and chromium which may have gone into solution during the acidic leaching process precipitates as hydroxide, and can be removed from the solution during the subsequent filtration.

The main quantity of nickel, copper and zinc shall now be removed from the ammoniacal leaching solution before the solution is used for renewed leaching. This is preferably done in a liquid-liquid extraction process. How these metals can be selectively extracted from an ammoniacal carbonate solution is known per se, and the process will therefore be described here rather summarily.

Copper and nickel can be extracted from ammoniacal solutions by an organic solution containing chelate-forming reagents, such as hydroxyoximes or hydroxyquinolines dissolved in a diluent. Kerosene having a high flash temperature is preferably used as diluent. Copper and nickel are separated from each other by extracting copper with a high loading on the reagent, followed by the extraction of nickel with the same reagent. This separation is based on the fact that copper is extracted preferentially before nickel. By carrying out the extraction with high capacity (maximum loading) on the reagent, copper suppresses the nickel. Almost only copper can therefore be extracted in a first extraction unit, and subsequently nickel can be extracted in a second extraction unit. The same reagent can be used in both cases. Due to variations of the metal contents in the leaching solutions, it is difficult to provide complete suppression of the nickel in all cases. The suppression of nickel can be controlled to a certain extent by means of the flow conditions and addition of copper. A scrubbing step for the nickel is therefore suitably inserted between extraction and re-extraction steps. A separation factor of about 1000 can easily be reached in the practical case. Re-extraction of both metals takes place using sulphuric acid solutions. In the case of copper, the copper metal is taken out by electrolysis, and in the case of nickel, nickel sulphate is crystallized out.

Zinc is precipitated as zinc carbonate by driving off ammonia with steam. By preheating the leaching solution the transport of $NH_3$ to the other phase is facilitated. Some $CO_2$ will also be driven off. The presence of $CO_2$ allows a possibility of regulating the conditions so that zinc carbonate is formed. This means, however, that the optimum conditions for precipitation cannot be judged independent of the corresponding condition for the leaching step. An excess content of free $NH_3$ means a poorer starting situation for the precipitation, and the overall losses of $NH_3$ can be expected to be greater.

The invention will now be illustrated while referring to the drawing, which schematically shows a plant for carrying out the process according to the invention. Metal hydroxide is supplied to a leaching tank 1, provided with an agitator. Ammoniacal carbonate solution is supplied through a pipe 2. Losses are replaced by the addition of ammonia through a pipe 37, and of carbon dioxide through a pipe 38. The solution is separated from the leaching residue in a filter 3 and is taken to a storage tank 4. The leaching residue is taken to a leaching tank 5 provided with an agitator. After leaching with sulphuric acid, the solution is separated from the leaching residue in a filter 6 and is taken to the leaching tank 1 via the pipe 2. The leaching residue taken from the filter 6 contains iron and chromium as hydroxides. The leaching residue also contains calcium sulphate, namely if the hydroxide supplied to the leaching tank 1 had been precipitated with lime from an acidic solution.

The ammoniacal solution is taken from the storage tank 4 via a pipe 7 to an extraction unit 8 for copper. The unit comprises four extraction apparatuses 9–12. Each apparatus contains one or more steps of the mixer-settler-type. In the first apparatus 9 the solution is contacted with an organic solution which is supplied via a pipe 13. When the phases have separated, the aqueous solution is taken through a pipe 14 through an extraction unit 15 for nickel. The organic phase, which has not only taken up copper but also some nickel, is depleted of nickel by being treated, in the second apparatus 10, with a nickel-free aqueous solution which is transferred from the nickel extraction unit 15 via the pipes 24 and 16. The organic solution is scrubbed in the third apparatus 11 with an ammoniumhydrogen solution and is treated in the fourth apparatus 12 by an aqueous solution containing 1–3 M free sulphuric acid supplied through a pipe 17. At this re-extraction, a large part of the copper content in the organic solution goes over to the sulphuric acid solution. The latter is passed through a pipe 18 to an electrolyzer 19 where metallic copper is recovered by electrolysis. The sulphuric acid solution, depleted of copper, is returned through the pipe 17 to the apparatus 12. The organic solution from the apparatus 12, depleted of copper, is returned through the pipe 13 to the apparatus 9 for renewed extraction.

The nickel extraction unit 15 contains three extraction apparatuses 20–22. Each apparatus contains one or more steps of the mixer-settler-type. In the first apparatus 20 the aqueous solution, depleted of copper, is contacted with an organic solution supplied through a pipe 23. After the phases have separated the aqueous solution is taken via a pipe 24 to a plant 25 for recovering zinc. The organic phase is scrubbed in the second apparatus 21 with an ammonium hydrogen carbonate solution, and is treated in the third apparatus 22 with an aqueous solution containing 1–7 free sulphuric acid, supplied through a pipe 26.

At this re-extraction a large part of the nickel content of the organic solution goes over to the sulphuric acid solution. The latter is led via a pipe 27 to a crystallizer 28, where nickel sulphate is crystallized out by cooling the solution. The sulphuric acid solution, depleted of nickel, is refluxed through the pipe 26 to the apparatus 22. The organic solution, depleted of nickel, is refluxed through the pipe 23 to the apparatus 20.

The plant 25 for recovering zinc contains a heat-exchanger 29, in which the solution coming in via the pipe 24 is heated. The preheated solution is taken into an ammonia stripper 30 where it meets steam from a boiler 31, to drive off the ammonia and some carbon dioxide. The gas driven off passes through the heat exchanger 29 and condenses in a cooler 34. The condensate is refluxed via the pipe 2 to the leaching vessel 1. The ammonia-free solution from the bottom of the stripper 30 goes partly to the boiler 31 and partly to a tank 32 where zinc carbonate precipitates. The carbonate is separated from the water in a drum filter 33, and the filtrate 35 is refluxed via pipe 2 to the leaching vessel 1.

A part of the filtrate is suitably used as scrubbing liquid in the scrubbing apparatuses 11 and 21, departing therefrom to the leaching vessel 1. To prevent built-up of impurities a bleed is taken out from the pipe 35 via a pipe 36.

EXAMPLE

In an electroplating plant there was obtained acidic waste water containing iron, chromium, nickel, copper and zinc. The metals were precipitated as hydroxides by the addition of lime. The precipitate was separated in a filter press. The filter sludge contained 15% solids. 100 kg of this filter sludge was introduced into a leaching tank with a volume of 2 m$^3$. There was also added to the leaching tank 495 l leaching liquid containing ammoniumhydrogen carbonate and ammonia in the following ratios:

$[NH_3] + [NH^{30}{}_4] = 5.85$ M; $[CO_3{}^{2-}] + [HCO_3] = 2.26$ M.

Leaching was carried out under agitation at 20° C for 18 hours. The leaching solution was separated from the leaching residue in a filter press. The result of leaching is shown in Table 1.

Table 1

|  | Cr | Fe | Zn | Cu | Ni |
|---|---|---|---|---|---|
| Metal in filter sludge, kg | 2.04 | 0.74 | 1.71 | 1.09 | 1.46 |
| Metal in leaching solution, kg | 0.15 | 0.03 | 1.24 | 0.89 | 0.66 |
| Metal in leaching residue, kg | 1.89 | 0.71 | 0.47 | 0.20 | 0.80 |
| Leached-out metal, % | 7.4 | 4.1 | 73 | 82 | 45 |

The leaching residue was put into the leaching tank and 100 l water was added. The contents of the leaching tank was heated to 60° C. By the addition of a total amount of 46.9 l 3M sulphuric acid during leaching, the pH was kept substantially constant at pH = 3. Leaching continued for 18 hours under agitation. The leaching solution was separated from the leaching residue in a filter press.

The result of this leaching is shown in Table 2.

Table 2.

|  | Cr | Fe | Zn | Cu | Ni |
|---|---|---|---|---|---|
| Metal in leaching solution, kg | 0.12 | 0.01 | 0.45 | 0.18 | 0.65 |
| Metal in leaching residue, kg | 1.77 | 0.70 | 0.02 | 0.02 | 0.15 |
| Leached-out metal, % | 6.3 | 1.4 | 96 | 90 | 81 |

397 l leaching solution from the ammoniacal leaching process was mixed with 55 l leaching solution from the sulphuric acid leaching process. The mixture was agitated for 6 hours. Iron and chromium precipitated as hydroxides. The precipitate was separated from the solution by filtering. The result of this precipitation process is shown in Table 3, which also shows the total leaching yield after the two leaching processes and the mixing of the two leaching solutions.

Table 3

|  | Cr | Fe | Zn | Cu | Ni |
|---|---|---|---|---|---|
| Metal in ammoniacal solution g/l | 0.25 | 0.05 | 2.13 | 1.53 | 1.13 |
| Metal in acidic solution, g/l | 0.69 | 0.06 | 2.55 | 1.01 | 3.72 |
| Metal in solution after mixing and filtering, g/l | 0.07 | 0.004 | 2.20 | 1.50 | 1.45 |
| Total amount of leached-out metal, % | 2.5 | 0.4 | 99 | 98 | 90 |

Copper, nickel and zinc were recovered from the solution obtained in the last-mentioned filtration, in the way illustrated on the attached drawing. It is to be noted that the process according to the Example differs from the process illustrated on the drawing at one point. According to the Example the filtration from the alkaline and acidic leaching process are mixed. According to the drawing the filtrate from the acidic leaching is introduced into the leaching tank 1. In the Example we have chosen to mix the two filtrates, since it is thus possible to illustrate clearly the re-precipitation of the iron and chromium dissolved during the acidic leaching process.

What is claimed is:

1. A process for extracting metals from a mixture of metal hydroxides containing at least one hydroxide of the metals selected from the group consisting of nickel, copper and zinc, and at least one hydroxide of the metals selected from the group consisting of iron and chromium, said process comprising (a) leaching the metal hydroxide mixture with an ammoniacal carbonate solution to dissolve nickel, copper and zinc, said ammoniacal carbonate solution containing free ammonia and ammonium ions in a total content of 3-7 moles per liter and carbonate and hydrogen carbonate ions in a total content of 1-3 moles per liter, (b) recovering by a liquid-liquid extraction process, at least one metal compound from the ammoniacal leaching solution thus obtained, (c) returning the ammoniacal solution to the ammoniacal leaching process, (d) leaching the solid leaching residue with sulphuric acid at a pH of 1.5-3 to dissolve a further amount of nickel, copper and zinc, and (e) passing the acidic leaching solution thus obtained to the ammoniacal leaching process.

2. The process of claim 1, wherein the copper and nickel are extracted from the ammoniacal leaching solution by a liquid-liquid extraction process, zinc is precipitated as carbonate by driving off ammonia from the ammoniacal solution, the ammonia-bearing vapor is condensed, and the condensate is returned to the ammoniacal leaching process.

* * * * *